United States Patent
Muthukumarasamy et al.

(10) Patent No.: US 7,523,340 B2
(45) Date of Patent: Apr. 21, 2009

(54) SUPPORT SELF-HEAL TOOL

(75) Inventors: Devarajan K. Muthukumarasamy, Snoqualmie, WA (US); Jayaprakasam S. Thirunavukkarasu, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 427 days.

(21) Appl. No.: 11/443,865

(22) Filed: May 31, 2006

(65) Prior Publication Data

US 2007/0294560 A1    Dec. 20, 2007

(51) Int. Cl.
G06F 11/00   (2006.01)

(52) U.S. Cl. .......................................... 714/2
(58) Field of Classification Search ............ 714/2, 714/5, 8, 15, 18, 25, 26, 37, 38
See application file for complete search history.

(56) References Cited

U.S. PATENT DOCUMENTS

| | | | |
|---|---|---|---|
| 5,113,398 | A | 5/1992 | Howes |
| 6,813,587 | B2 | 11/2004 | McIntyre |
| 6,883,118 | B2 * | 4/2005 | Morgan et al. ............. 714/43 |
| 2003/0101284 | A1 | 5/2003 | Cabrera |
| 2004/0078622 | A1 | 4/2004 | Kaminsky |
| 2004/0103185 | A1 | 5/2004 | Combs |
| 2004/0153823 | A1* | 8/2004 | Ansari ................... 714/38 |
| 2005/0027480 | A1* | 2/2005 | Qiao et al. ............... 702/183 |
| 2005/0081111 | A1 | 4/2005 | Morgan |
| 2005/0086630 | A1* | 4/2005 | Chefalas et al. ........... 717/100 |
| 2005/0097405 | A1 | 5/2005 | Sesek |
| 2005/0243740 | A1 | 11/2005 | Chen |
| 2005/0283643 | A1 | 12/2005 | Banerjee |
| 2006/0047826 | A1 | 3/2006 | Cromer |
| 2006/0136892 | A1* | 6/2006 | Branch et al. ............. 717/168 |

OTHER PUBLICATIONS

Sterritt, R., et al., "Personal Autonomic Computing Self-healing Tool," Proceedings, 11th IEEE Int. Conf. and Workshop on the Eng. of Computer-Based Systems (abstract). 2004.

Sterritt, R., et al., "PAC-MEN: Personal Autonomic Computing Monitoring Environment," Proceedings, 15th Int. Workshop on Database and Expert Systems Applications (abstract), 2004.

(Continued)

*Primary Examiner*—Nadeem Iqbal
(74) *Attorney, Agent, or Firm*—Vierra Magen Marcus & DeNiro LLP

(57) ABSTRACT

A self-heal tool performs self-healing tasks such as diagnostic and repair tasks at the computer host to resolve a user problem. The self-heal tool includes an instruction file and a self-heal engine which executes instructions in the instruction file. The self-healing tasks can therefore be defined independently of the engine. Further, self-healing tasks can be added, deleted or modified without replacing the entire instruction file. The self-healing tasks can involve file input-output, registry-related repairs and operating system-related repairs, for instance. The instruction file can be provided as an XML file having a hierarchy of nodes, including issue nodes that identify a diagnostic and/or repair issue, intermediate nodes referenced by the issue nodes, and task nodes that are referenced by the intermediate nodes, and that define the self-healing tasks. The data structure facilitates updates and code sharing by the issue nodes and/or intermediate nodes.

20 Claims, 7 Drawing Sheets

OTHER PUBLICATIONS

Dashofy, E., et al., "Towards Architecture-based Self-Healing Systems," Workshop on Self-healing Systems, Institute for Software Research, University of California, Irvine, 2002, pp. 21-26.

Yang, Q., et al., "A Framework for Dynamic Software Architecture-based Self-Healing," ACM SIGSOFT Software Engineering Notes. Jul. 2005, vol. 30, No. 4.

* cited by examiner

Fig. 2

What do you want to diagnose and/or repair?

--------------------Core issues--------------------
      Installation related issues
      Client sign-in or browsing related issues
      Client email related issues
      Messaging related issues --------Internet browser related issues--------
      Optimize Internet browser
      Repair Internet browser
      Install Internet browser from CD ---------------Miscellaneous issues---------------
      Perform clean un-install
      Repair TCP/IP stack
      Repair programming interface stack

[ Run ]

Fig. 3

Optimize Internet Browser

| Status | Information | Value |
|---|---|---|
| ☑ | Optimize Internet Browser | Optimization Successful |

[ Save result ]

Fig. 4

| Status | Information | Value |
|---|---|---|
| | Messaging related issues | |
| | OS information: | |
| ☑ | Operating system | Win XP SP2 |
| ☑ | Is Administrator | True |
| ☑ | Local language | English |
| | Installed client version: | |
| ☑ | Messaging version | 7.5 |

Save result

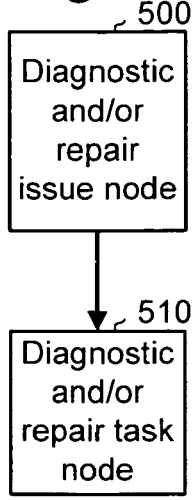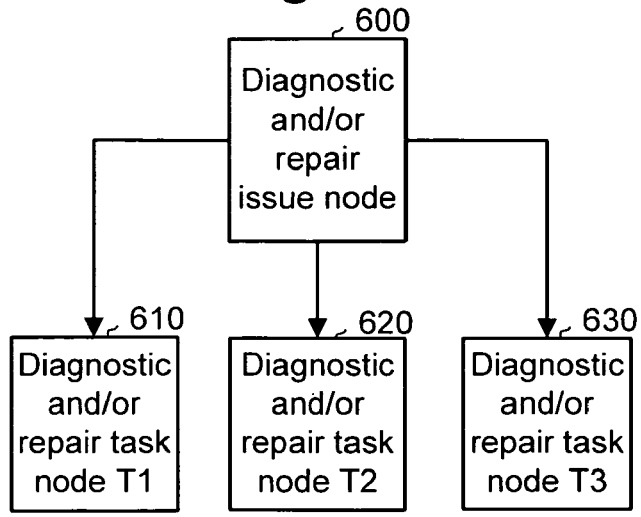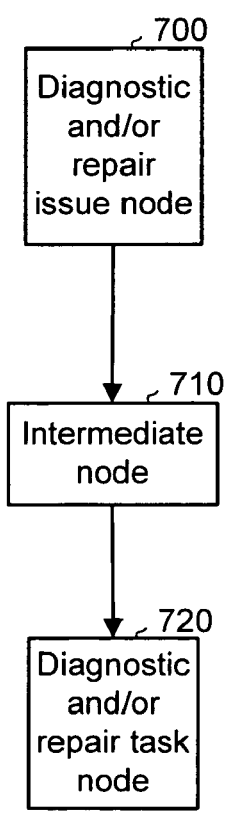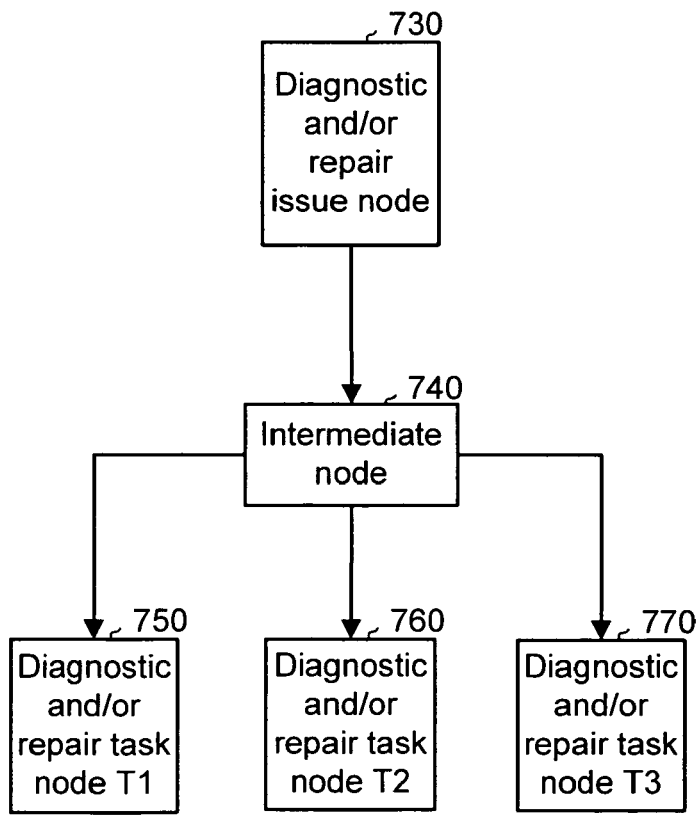

SUPPORT SELF-HEAL TOOL

BACKGROUND

As the use of computer software becomes increasingly prevalent among the general population, there is a corresponding need for diagnosing and repairing software-related problems. Typically, the user becomes aware of a problem when an application does not behave as expected. Applications such as Internet browsers, messaging, e-mail and the like oftentimes experience problems for various reasons, such as improper configuration settings, corrupted files, software bugs and viruses, incompatible hardware and the like. To resolve a problem, the user may contact a customer support agent via e-mail, telephone or chat, for instance. The manufacturer of the application may provide this service to its customers pursuant to a sales contract or as a marketing tool. The agent guides the user through different steps which can lead to a diagnosis and resolution of the problem. However, this approach is time-consuming and inconvenient for the user, as well as expensive for the company providing the customer support.

Various software tools for diagnostics and repair have been developed which can be accessed by the user via interface screens. For example, the manufacturer of an application may identify a number of specific software glitches which are expected to occur, and the appropriate repairs for them, e.g., based on testing or user feedback from using the application. The interface screens prompt the user to select a description of the problem so that repair software can perform the appropriate diagnosis and repair. The diagnosis and repair information is typically hard coded into the application and installed on the user's machine when the application is installed. However, for a new application, it can be difficult to predict what types of problems will occur, and to identify appropriate repairs. In this case, in order to address new problems which inevitably occur, it is necessary to provide a software patch which includes the necessary diagnostic and repair software. The user is required to install the software patch on the host machine. This approach is expensive, time consuming and inconvenient as well. For example, the download time experienced by the user can be excessive, especially for users with lower bandwidth connections. Moreover, the installation of the patch may present its own set of problems which require assistance by customer support agents.

A solution is needed for providing diagnosis and repair of software problems in a manner which facilitates updates and which is compatible with multiple applications on a computer host.

SUMMARY

The technology described herein provides a self-heal tool for performing self-healing tasks at a computer host. Self-healing tasks can include diagnostic and repair tasks which are executed at the computer host to resolve a user problem, for instance. The self-heal tool includes an instruction file and a self-heal engine which executes instructions in the instruction file. The self-healing tasks can therefore be defined independently of the engine. Further, self-healing tasks can be added, deleted or modified without replacing the entire instruction file.

In one aspect, a computer-implemented method for performing self-healing at a computer host includes providing a file of instructions at the computer host which defines one or more self-healing tasks. A self-healing engine is also provided at the computer host for executing the one or more self-healing tasks using the file of instructions. For example, the self-healing engine can be provided via an executable file or hosted on at least one web page of a user interface. The file of instructions can define self-healing tasks for a number of different applications at the computer host, such as e-mail applications, messaging applications, and the like. Further, the file of instructions can be updated independently of the self-healing engine. For example, the computer host can receive information via a remote download for updating the file of instructions, such as by modifying, adding or deleting self-healing tasks. The self-healing engine can execute the self-healing tasks responsive to a command received via a user interface, or based on a request from an application at the computer host, for instance. The self-healing task can include various tasks, such as reading, writing and deleting a file at the computer host, reading, writing and deleting a registry key, running a command line statement, starting and stopping a service at the computer host and registering a library.

In another aspect, a computer readable media is provided having computer readable code for providing a file of instructions for providing self-healing at a computer host. The file of instructions includes code segments for providing a number of first and second nodes according to a markup language such as XML. The nodes may include elements and tags. Each of the first nodes identifies an associated diagnostic and/or repair issue involving the computer host, while each of the second nodes defines a different diagnostic and/or repair task. Further, one or more of the second nodes is invoked responsive to one or more of the first nodes being invoked. The file of instructions can further include code segments for providing third nodes, where each of the third nodes references one or more of the second nodes. One of the third nodes is invoked responsive to the one or more first nodes being invoked. Additionally, the one or more of the second nodes is invoked responsive to the one or more of the third nodes being invoked. Thus, a three tiered hierarchy can be defined which includes the first nodes, the third nodes below the first node, and the second nodes below the third nodes.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

FIG. 2 illustrates a user interface display which prompts a user to select a diagnostic and/or repair issue.

FIG. 3 illustrates a user interface display which provides diagnostic and/or repair information for optimizing an Internet browser.

FIG. 4 illustrates a user interface display which provides diagnostic and/or repair information for messaging related issues.

FIG. 5 illustrates a hierarchy of an instruction file of a self-healing tool in which a node identifying a diagnostic and/or repair issue directly references a node identifying a diagnostic and/or repair task.

FIG. 6 illustrates a hierarchy of an instruction file of a self-healing tool in which a node identifying a diagnostic and/or repair issue directly references multiple nodes identifying multiple diagnostic and/or repair tasks.

FIG. 7*a* illustrates a hierarchy of an instruction file of a self-healing tool in which a node identifying a diagnostic and/or repair issue references an intermediate node which, in turn, references a node identifying a diagnostic and/or repair task.

FIG. 7b illustrates a hierarchy of an instruction file of a self-healing tool in which a node identifying a diagnostic and/or repair issue references an intermediate node which, in turn, references multiple nodes identifying multiple diagnostic and/or repair tasks.

DETAILED DESCRIPTION

A self-heal tool is provided for performing self-healing tasks at a computer host to allow users to independently diagnose and resolve problems. The self-heal tool includes an instruction file and a self-heal engine which executes instructions in the instruction file so that the self-healing tasks can be defined independently of the engine. Specific details of the self-heal tool are provided below.

Figure 1:
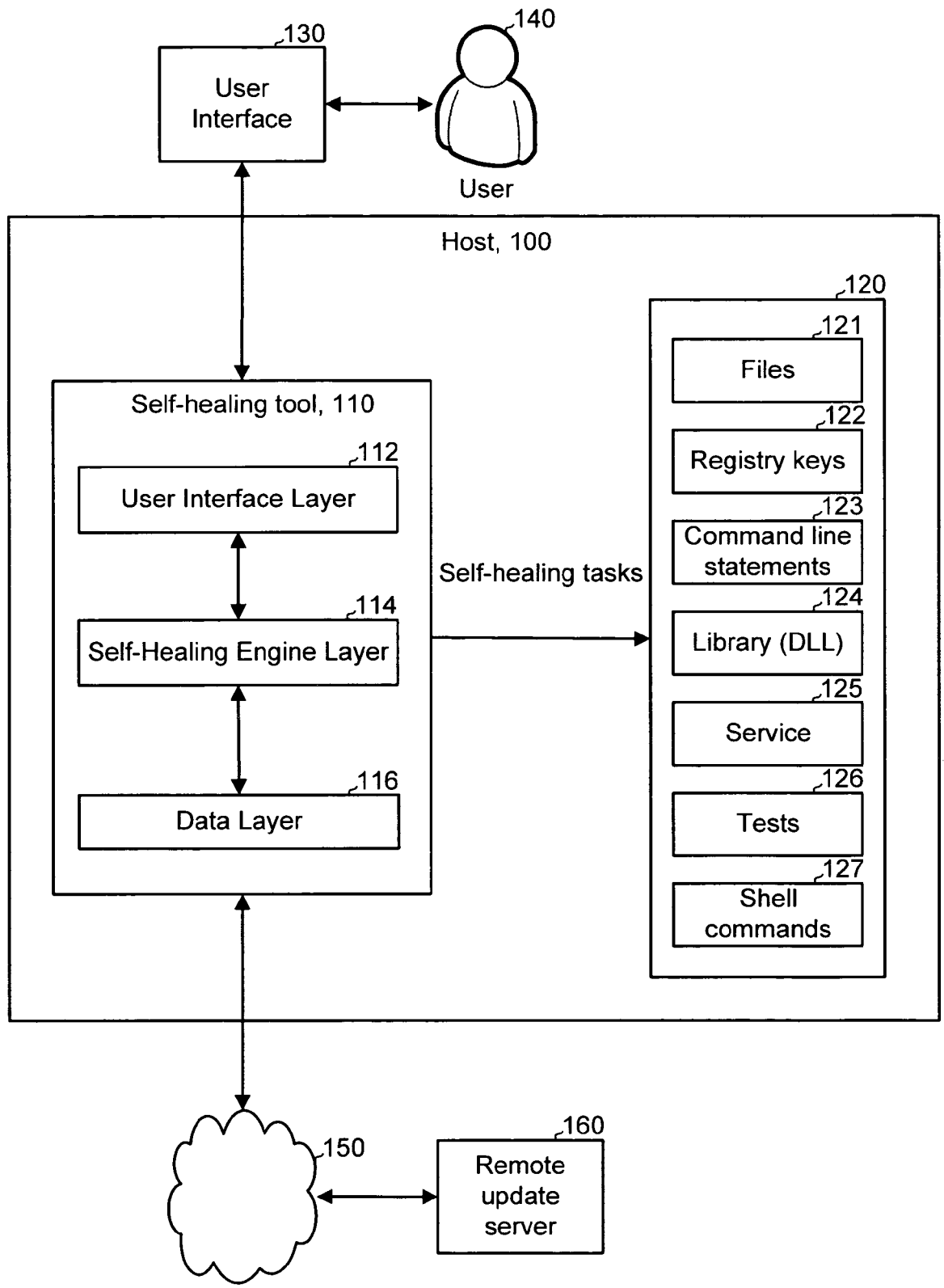
FIG. 1 illustrates an overview of a self-healing tool on a computer host.

FIG. 1 illustrates an overview of a self-healing tool on a computer host. The self-healing tool 110 can be installed on a computer host 100, such as a laptop or desktop computer, PDA, cell phone or other device. The self-healing tool 110 may have a three-tiered architecture which includes a user interface layer 112, a self-healing engine layer 114 and a data layer 116. The user interface layer 112 provides a user interface 130 to allow a user 140 to input a command to the self healing tool 110, such as a selection of a diagnostic and/or repair issue with which the user is concerned. The user interface layer 112 can also report diagnostic and/or repair information to the user via the user interface 130, including an indication of whether the issue was successfully resolved, prompts for additional information from the user, and so forth. For instance, the user interface 130 may be provided on a display device of the computer host 100. The user interface 130 may include an audio component, such as voice recognition circuit and speaker, additionally, or alternatively. The User Interface Layer 112 can be customized to any format, for example, as a desktop client or web ActiveX® control. In another approach, an application running at the computer host 100, such as an email, messaging or Internet browser application, automatically communicates with the self-healing tool 110, without user intervention, to diagnose and/or repair a problem.a The self-healing engine layer 114 can execute self-healing tasks, based on instructions from the data layer 116, for one or more applications at the computer host 100. For example, the self-healing engine layer 114 can be provided by one or more executable files (.EXE), or by an HTML web page with a control such as an ActiveX® control embedded in it. The self-healing engine can be wrapped as an ActiveX control and hosted on the HTML page to perform the same tasks as a standalone executable. The ActiveX® control will provide a seamless web experience for the users in resolving an issue. ActiveX® refers to a set of technologies developed by Microsoft Corporation for sharing information among different applications. The self-healing engine can be independent, and can operate as a plug and play module. The data layer 116 may include one or more instruction files, e.g., local stores, in a markup language such as XML, or in another self-describing language. An instruction file instructs the self-healing engine to perform certain self-healing tasks. The instruction file may be encrypted in the data layer to avoid misuse by hackers, and decrypted by the self-healing engine layer 114 as needed.

The instruction file in the data layer 116 can be updated by a remote update server 160 via a network 150 such as the Internet. As discussed further below, the update can be in the form of a XML node definition e.g., a small encrypted XML file, which includes parameters and tags. The node definition can be inserted into the existing XML instruction file, in one approach. The node definition requires relatively little data and can therefore be downloaded quickly by the client host 100, even when a low speed network connection, such as a dial up connection, is used.

Moreover, by maintaining the data layer 116 separately from the self-healing engine layer 114, the instruction file can be updated independently of the self-healing engine, so no change is required to the self-healing engine to achieve an updated self-healing functionality. Customizing the self-healing tool 110 for any application at the computer host can be achieved by simply modifying the local store file. Generally, the self-healing tool can be updated to modify an existing self-healing task, add a new self-healing task, and delete an existing self-healing task.

The self-healing engine can perform any number of self-healing tasks, which include diagnostic and/or repair tasks. A diagnostic task generally refers to a task involving identifying a problem or other condition at the computer host, while a repair task generally refers to a task involving resolving the diagnosed problem or other condition. Further, a repair task can be performed based on the result of a diagnostic task. In particular, the smart self healing tool 110 can diagnose and self heal any type of client side problem. The self-healing tasks (120) can include modify and deleting files, including reading and writing to files (121), modifying, deleting and creating registry keys, including reading and writing to registry keys (122), and running command line statements to invoke utilities or modify parameters, e.g., ipconfig/flushdns (123). Ipconfig is a DOS utility which can be used from MS-DOS and a MS-DOS shell to display all current TCP/IP network configuration values and to refresh Dynamic Host Configuration Protocol (DHCP) and Domain Name System (DNS) settings. The self-healing tasks can further include registering/calling a dynamic link library (DLL) or other library (124). Re-registering a DLL or other library can resolve a corruption in a registry. This, in turn, can resolve any problem with a missing class id or interface id for the DLL, for instance. If a DLL file is missing or if it cannot successfully be re-registered, an exception is thrown and communicated to the user. The self-healing tasks can further include stopping and starting a service (125), running tests such as ping tests (126), running shell commands (127), and so forth. The flushdns parameter of ipconfig flushes and resets the contents of the DNS client resolver cache. The self-healing tasks thus can involve file input-output, registry-related repairs and operating system-related repairs, as well as others.

The following provides an example list of self-healing tasks which can be performed, including repair tasks and diagnostic tasks.

Repair Tasks:
1) Fix Secure Sockets Layer (SSL) corruption
2) Fix cryptographic service corruption 3) Repair Transmission Control Protocol (TCP)/Internet Protocol (IP) stack
4) Repair Winsock stack (Windows Sockets, or Winsock, is a specification which defines a network programming interface for Microsoft Windows®, and which is based on a socket paradigm)
5) Restore Internet Explorer® or other Internet browser settings
   a. Deleting cache and cookie
   b. Reset security settings to default
   c. Resets advanced settings to default
   d. Resets privacy cookie settings to default
   e. Flush SSL certificate
   f. Reset Internet browser offline flag
6) Repair Internet browser
   a. Repair all basic Internet Explorer DLLs or other Internet browser libraries
7) Fix cipher strength problem
8) Verify date and time
9) Fix XML parser corruption
10) Fix Installer log corruption
11) Fix Client registry corruption
12) Perform clean un-install
13) Install Internet browser, e.g., from CD
14) Fix Windows or other operating system (OS) installer service corruption
15) Fix host file hijacking
16) Archive and restore email database folder
17) Renew and release IP address
18) Restart Windows or other OS installer service
19) Change desktop screen resolution
20) Fix installer bad certification download failure Diagnostic Tasks:
1) Get operating system details (e.g., Win XP, Win 98)
2) Check whether user is an administrator
3) Check operating system language (English, French etc.)
4) Check MSN or other client version if installed on the local computer
5) Check MSN Messenger or other messaging application version, if installed on the local computer
6) Check Internet Explorer or other Internet browser version
7) Check Internet Explorer or other Internet browser cipher strength
8) Get installed modem (if more than one is found, get a list of the modems)
9) Get Windows or other OS installer version
10) Check system requirements:
    a. Processor speed
    b. Total random access memory (RAM)
    c. Available RAM
    d. Available hard disk space
    e. Screen resolution
    f. Dots per inch (DPI) screen settings
11) Perform basic ping test for loopback and localhost
12) Get IP address
13) Get gateway server IP address
14) Ping gateway server address
15) Pinging of websites, such as on web servers, to ensure a client application can reach the server.
16) Detect firewall The self-healing tool can provide significant advantages in diagnosing and/or repairing issues at a client host machine, thereby reducing the need for expensive customer support services and minimizing customer inconvenience. Moreover, customer support agents can be freed to focus on solving more difficult customer problems. As a result, monetary savings and increased customer satisfaction can be achieved.

For example, consider a first scenario, where a user can not detect an Internet connection due to SSL corruption. This is a "No Internet connection Error". The steps to repair the SSL corruption using the Microsoft Windows XP® operating system, for instance, are:
1) regsvr32 softpub.dll
2) regsvr32 wintrust.dll
3) regsrv32 initpki.dll
4) regsvr32
5) Internet browser optimization and other steps to narrow down this issue The tool "regsvr32" is a command-line tool that registers .dll files as command components in the registry. Comparable steps can be used for other operating systems. The time needed for an agent to guide the user in performing these commands is about ten to twenty minutes. In comparison, the self-healing tool can accomplish the diagnosis and repair within about five seconds.

In a second scenario, the user is unable to sign in due to corruption in Internet browser settings due to spy ware or erroneous settings made by the user. The steps to repair this issue involve optimizing the Internet browser by:
1) Clearing Internet browser Cache
2) Clearing Internet browser cookies
3) Changing Privacy Settings to default
4) Changing Advanced Settings to default
5) Changing Security Settings to default The time needed for an agent to guide the user in performing these commands is about thirty to forty minutes. In comparison, the self-healing tool can accomplish the diagnosis and repair within about five to thirty seconds, depending on the cache size.

In a third scenario, an error is received when the user is installing an Internet browser. For example, in the Microsoft Windows® OS, Error 8010 may be generated during. MSN 9 Internet browser installation from a CD. This error occurs when user tries to install MSN but can not reach a sign-up server. This can occur due to, e.g., a firewall blocking the installer from reaching the Internet, TCP/IP corruption, Winsock corruption, or insufficient system capabilities. Troubleshooting this error can be difficult because the customer support agent might not know where the problem lies. The self-healing tool automatically checks the system requirement, detects any firewall, resets the TCP/IP stack and resolves the Winsock corruption. Specifically, the steps to diagnose and repair this issue involve:
1) checking for system Requirements
2) Detecting a firewall
3) Resetting TCP/IP and Winsock stack Comparable steps can be used for other programs. The time needed for an agent to guide the user in performing these commands is about forty-five minutes. In comparison, the self-healing tool can accomplish the diagnosis and repair within about five seconds.

FIG. 2 illustrates a user interface display 200 which prompts a user to select a diagnostic and/or repair issue. The display 200 is generated by the user interface layer 112 of the self-healing tool 110 to allow the user to enter a command relating to an issue which needs to be diagnosed and/or repaired. For example, the display 200 lists a number of core issues, including installation related issues, client sign-in or browsing related issues, client email related issues, and messaging related issues. Also provided are Internet browser related issues, including options to optimize an Internet browser, repair an Internet Browser, and install an Internet browser from a compact disc (CD). Guiding a user in installing an Internet browser can be a difficult task for customer support agents. The self-healing tool will first try to repair an existing Internet browser, e.g., by re-registering system related DLLs. If this is not successful, then the self-healing tool can re-install the Internet browser from a CD, for instance, when the customer does not have an Internet connection to download new browser software. Lastly, miscellaneous issues are provided, including options to perform clean un-install, repair a TCP/IP stack, and repair a programming interface (e.g., Winsock) stack. The display 200 can include a drop down list or other device which allows the user to select one or more of the options using a mouse or other pointing device, for instance. Once an option is selected, the user selects a "Run" button 210, which causes the self-healing tasks for the issue to be executed, resulting in the display 300 of FIG. 3. The display 200 is generated by the user interface layer 112 of the self-healing tool 110 according to the instruction file in the data layer 116.

FIG. 3 illustrates a user interface display which provides diagnostic and/or repair information for optimizing an Internet browser. The display 300 indicates that the "Optimize Internet Browser" issue has been selected, and the associated self-healing tasks have been performed. The display 300 provides status, information and value columns. The information is for "Optimize Internet Browser". The value "Optimization Successful" indicates that the one or more self-healing tasks for the issue of "Optimize Internet Browser" were successfully performed. The check mark under "status" provides a further confirmation of an acceptable status. A "save result" button 310 allows the user to save the display 300 to a file for later reference. Note that the diagnostic and/or repair information which is provided to the user via the interface 300 is relatively simple, although a number of different self-healing tasks may have been performed in order to successfully address the selected issue. In one approach, the amount of information which is presented is minimized to avoid confusion. Optionally, the self-healing tool is configurable by the user to provide a more detailed report.

FIG. 4 illustrates a user interface display which provides diagnostic and/or repair information for messaging related issues. The display 400 indicates that the "Messaging related issues" issue has been selected, and the associated self-healing tasks have been performed. The information provided includes "OS information" and "Installed client version" information. Under "OS information", a first entry is "Operating System", which has a value of "Win XP SP2", indicating the Microsoft Windows XP® operating system, service pack 2. A second entry is "Is Administrator", which has a value of "true", indicating that the user has administrator privileges. A third entry is "Local language", which has a value of "English". Under "Installed client version", a "Messaging version" entry has a value of "7.5". The status is acceptable for each entry. The "save result" button 410 allows the user to save the display 400 to a file for later reference.

FIG. 5 illustrates a hierarchy of an instruction file of a self-healing tool in which a node identifying a diagnostic and/or repair issue directly references a node identifying a diagnostic and/or repair task. The instruction file in the data layer of the self-healing tool can be provided using a markup language such as XML, in which nodes of the instruction file are arranged in a hierarchy. Each node includes one or more elements, and tags which describe the elements. In one approach, high level nodes identify different diagnostic and/or repair issues, such as issue node 500, and lower level nodes identify corresponding diagnostic and/or repair tasks as the self-healing tasks, such as task node 510. Further, the issue node 500 references the task node 510. Thus, the task node 510 is invoked responsive to the issue node 500 being invoked. In this example, there is only one self-healing task needed to perform the diagnostics and/or repairs.

FIG. 6 illustrates a hierarchy of an instruction file of a self-healing tool in which a node identifying a diagnostic and/or repair issue directly references multiple nodes identifying multiple diagnostic and/or repair tasks. In this case, the high level, issue node 600 directly references three different task nodes, namely task node T1 610, task node T2 620 and task node T3 630. Thus, three self-healing tasks are used to perform the diagnostics and/or repairs. In particular, the tasks nodes T1 610, T2 620 and T3 630 are invoked responsive to the issue node 600 being invoked. The order in which the task nodes T1 610, T2 620 and T3 630 are invoked can be defined by the issue node 600, for instance. Various other approaches are possible for invoking the self-healing tasks.

FIG. 7a illustrates a hierarchy of an instruction file of a self-healing tool in which a node identifying a diagnostic and/or repair issue references an intermediate node which, in turn, references a node identifying a diagnostic and/or repair task. In this case, the high level issue node 700 references an intermediate node 710 which, in turn, directly references a self-healing task node 720. The intermediate node 710 is invoked responsive to the issue node 700 being invoked, and the task node 720 is invoked responsive to intermediate node 710 being invoked. Thus, it can also be said that the task node 720 is invoked responsive to the issue node 700 being invoked.

FIG. 7b illustrates a hierarchy of an instruction file of a self-healing tool in which a node identifying a diagnostic and/or repair issue references an intermediate node which, in turn, references multiple nodes identifying multiple diagnostic and/or repair tasks. In this case, the high level issue node 730 references an intermediate node 740 which, in turn, references one or more self-healing task nodes, namely task node T1 750, task node T2 760 and task node T3 770. Intermediate node 740 is invoked responsive to issue node 730 being invoked, and tasks nodes T1 750, T2 760 and T3 770 are invoked responsive to the intermediate node 740 being invoked. Thus, it can also be said that the tasks nodes T1 750, T2 760 and T3 770 are invoked responsive to the issue node 730 being invoked.

The use of an intermediate node level in the hierarchy of nodes moves code away from the issue nodes to provide better organization and facilitate updates. Various other approaches can be used. For example, additional node levels in the hierarchy can be provided.

Figure 8:
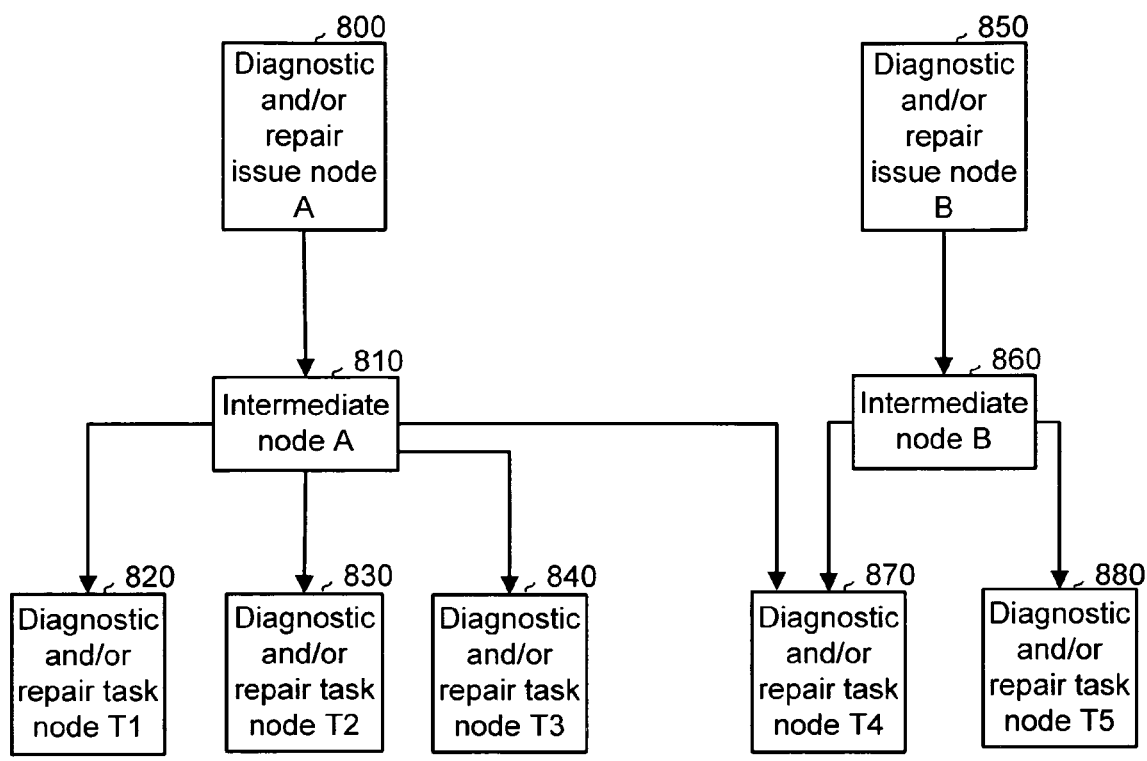
FIG. 8 illustrates a hierarchy of an instruction file of a self-healing tool in which nodes identifying different diagnostic and/or repair issues reference a common node identifying a diagnostic and/or repair task.

FIG. 8 illustrates a hierarchy of an instruction file of a self-healing tool in which nodes identifying different diagnostic and/or repair issues reference a common node identifying a diagnostic and/or repair task. Here, the task node T4 870 can be invoked by either of the issue nodes, issue node A 800 and issue node B 850, for instance. This approach is efficient because the same task instructions can be used for addressing multiple diagnostic and/or repair issues. Issue node A 800 invokes an intermediate node A 810 which, in turn, invokes task nodes T1 820, T2 830, T3 840 and T4 870. Thus, it can also be said that the task nodes T1 820, T2 830, T3 840 and T4 870 are invoked responsive to the issue node A 800 being invoked. Issue node B 850 invokes an intermediate node B 860 which, in turn, invokes task nodes T4 870 and T5

880. Thus, it can also be said that the task nodes T4 870 and T5 880 are invoked responsive to the issue node B 850 being invoked. The arrangement provided is an example only. In practice, sharing of task nodes among the issue nodes can be quite prevalent. Such code sharing facilitates updates and streamlines the instruction file. Moreover, it is possible to share the code of intermediate nodes among multiple issue nodes.

Example code segments based on the above-mentioned hierarchical data structures for an instruction file of a self-healing tool are discussed below.

The following XML code may be used for defining the diagnostic and/or repair issues in the display 200:

erences the intermediate node "EMAIL", the issue node "Messaging related issues" references the intermediate node "MESSG", the issue node "Optimize Internet browser" references the intermediate node "OPTIB", the issue node "Repair Internet browser" references the intermediate node "REPIB", the issue node "Install Internet browser from CD" references the intermediate node "INSTI_IB", the issue node "Perform clean un-install" references the intermediate node "INST_CLEAN_UNINSTALL", the issue node "Repair TCP/IP stack" references the intermediate node "REPTCP", and the issue node "Repair programming interface stack" references the intermediate node "REPWIN".

```
<Issues>
    <Issue Type="Inline" Section=""> <![CDATA[What do you want to diagnose and/or repair?]]> </Issue>
    <Issue Type="Inline" Section=""> <![CDATA[--------------------------Core Issues----------------------------------]]> </Issue>
    <Issue Type="Inline" Section="INST"> <![CDATA[Installation related issues]]> </Issue>
    <Issue Type="Inline" Section="CLIENT"> <![CDATA[Client sign-in or browsing related issues]]> </Issue>
    <Issue Type="Inline" Section="EMAIL"> <![CDATA[Client email related issues]]> </Issue>
    <Issue Type="Inline" Section="MESSG"> <![CDATA[Messaging related issues]]> </Issue>
    <Issue Type="Inline" Section=""> <![CDATA[--------------------------Internet browser related issues-------------------------------------]]> </Issue>
    <Issue Type="Inline" Section="OPTIB"> <![CDATA[Optimize Internet browser]]> </Issue>
    <Issue Type="Inline" Section="REPIB"> <![CDATA[Repair Internet browser]]> </Issue>
    <Issue Type="Inline" Section="INST_IB"> <![CDATA[Install Internet browser from CD]]> </Issue>
    <Issue Type="Inline" Section=""> <![CDATA[--------------------------Miscellaneous issues-------------------------------------]]> </Issue>
    <Issue Type="Inline" Section="INST_CLEAN_UNINSTALL"> <![CDATA[Perform clean un-install]]> </Issue>
    <Issue Type="Inline" Section="REPTCP"> <![CDATA[Repair TCP/IP stack]]> </Issue>
    <Issue Type="Inline" Section="REPWIN"> <![CDATA[Repair programming interface stack]]> </Issue>
</Issues>
```

The tags <Issues> and </Issues> at the start and end of the code segment, respectively, are XML tags that define a node, e.g., an element. Similarly, the tags <Issue> and </Issue> are XML tags that define nodes within the <Issues> node. In one approach, the issue nodes 500, 600, 700, 730, 800 and 850 of FIGS. 5-8 are identified by the <Issue> tags. Additionally, parameters within each node can reference one or more other nodes. For example, for the <Issue> node "Installation related issues", the code <Issue Type="Inline" Section="INST"> denotes a reference to a node identified by the tag INST, which is provided inline, e.g., within, the same XML instruction file. Optionally, the INST node could be provided in another file, in which case a path to the other file would be provided. The INST node, which is an intermediate node, similar to the intermediate nodes 710, 740, 810 and 860 of FIGS. 7a, 7b and 8, is thus referenced by an <Issue> node, and will therefore be invoked responsive to the associated <Issue> node being invoked. The code <![CDATA[Installation related issues]]> indicates that "Installation related Issues" is character data, not markup.

The other issue nodes similarly reference associated intermediate nodes. For example the issue node "Client sign-in or browsing related issues" references the intermediate node "CLIENT", the issue node "Client email related issues" ref- An <Issue> node can be invoked based on a user command received via the user interface 130, or the node can be invoked automatically in response to a message from an application running at the computer host. An appropriate protocol can be provided for enabling the application and the self-healing tool to communicate with one another.

Regarding the "Optimize Internet browser" issue selected in the display 300 of FIG. 3, the following code segment defines the intermediate OPTIB node that is referenced.

```
<OPTIB>
    <Act Type="Fix" SubType="Lib" Loc="Inline">
        <Name>Optimize Internet Browser</Name>
        <Value>LIB_OPT_IB</Value>
        <SuccMsg>Optimization Successful</SuccMsg>
        <FailMsg>Optimization Failed</FailMsg>
    </Act>
</OPTIB>
```

The OPTIB node, in turn, references a node whose value is "LIB_OPT_IB". The LIB_OPT_IB node includes a number of self-healing task nodes that are invoked when the OPTIB node is invoked, as discussed further in connection with the code segment provided below. The Action (Act) type is "fix", indicating that the action is a repair, e.g., a fix, and a sub type (SubType) is "Lib" (library), which means the LIB_OPT_IB-node is in a library section of the instruction file. The <Name> tag identifies the name which appears under the "Information" column (FIG. 3). The <Value> tag identifies the referenced node LIB_OPT_IB. The <SuccMsg> tag identifies a message (e.g., "Optimization Successful") which is displayed under the "Value" column (FIG. 3) when the tasks identified by LIB_OPT_IB are successfully invoked, while the <FailMsg> tag identifies a message (e.g., "Optimization Failed") which is displayed under the "Value" column (FIG. 3) when the tasks identified by LIB_OPT_IB are not successfully invoked. Thus, the self-healing tasks in the library LIB_OPT_IB are invoked when the intermediate node OPTIB, and the "Optimize Internet browser" issue node are invoked.

The following code segment defines the LIB_OPT_IB node which is referenced by the "Optimize Internet browser" issue node. The LIB_OPT_IB node includes a number of self-healing task nodes. The self-healing tasks include clearing a cache, clearing cookies and registry fixes, denoted by SubType="RegFix". For some of the tasks, the user is prompted to provide additional inputs to control the task. For example, for the task of clearing the Internet browser cache, the user is prompted to authorize the deletion of temporary Internet files. Status information can be provided on the user interface as the tasks are performed, as represented by the <UValue> tag. In some cases, data needed for fixing a specific registry is provided, e.g., under the <KeyValue> tag, in addition to a path, under the <Path> tag. An excerpt of the binary <KeyValue> data is provided. Additional self-healing task nodes can be defined similarly for other diagnostic and/or repair issues.

```
<!-- Optimize Internet Browser -->
<LIB_OPT_IB UIValue="Optimizing Internet Browser">
    <Act Type="Fix" SubType="ComFix">
        <CommonFix>CLEAR_IB_CACHE</CommonFix>
        <PromptMsg>The Support Self-Heal tool needs to delete your
        temporary Internet files. Press Yes to Continue or No to keep
        the temporary Internet files.</PromptMsg>
        <UIValue>Clearing Internet Browser Cache</UIValue>
    </Act>
    <Act Type="Fix" SubType="ComFix">
        <CommonFix>CLEAR_IB_COOKIE</CommonFix>
        <PromptMsg>The Support Self-Heal tool needs to delete your
        Internet cookies. Press Yes to Continue or No to keep the Internet
        cookies.</PromptMsg>
        <UIValue>Clearing Internet Browser Cache</UIValue>
    </Act>
    <Act Type="Fix" SubType="RegFix">
        <Root>Both</Root>
        <Path>Software\Microsoft\Windows\CurrentVersion\Internet
        Settings\zonemap\Domains</Path>
        <RegFixMode>Delete</RegFixMode>
        <SkipResult>yes</SkipResult>
    </Act>
<!--Local Intranet Zone-->
    <Act Type="Fix" SubType="RegFix">
        <Root>HCU</Root>
        <Path>Software\Microsoft\Windows\CurrentVersion\Internet
        Settings\zones\1</Path>
        <Bulk>yes</Bulk>
        <KeyValue>1001=1,1004=3,1200=0...
        </KeyValue>
        <KeyType>Word</KeyType>
        <RegFixMode>Edit</RegFixMode>
    </Act>
```

-continued

```
<!-- Trusted Zones -->
    <Act Type="Fix" SubType="RegFix">
        <Root>HCU</Root>
        <Path>Software\Microsoft\Windows\CurrentVersion\Internet
        Settings\zones\2</Path>
        <Bulk>yes</Bulk>
        <KeyValue>1001=0,1004=1,1200=0...</KeyValue>
        <KeyType>Word</KeyType>
        <RegFixMode>Edit</RegFixMode>
    </Act>
<!--Internet-->
    <Act Type="Fix" SubType="RegFix">
        <Root>HCU</Root>
        <Path>Software\Microsoft\Windows\CurrentVersion\Internet
        Settings\zones\3</Path>
        <Bulk>yes</Bulk>
        <KeyValue>1001=1,1004=3,1200=0...
        </KeyValue>
        <KeyType>Word</KeyType>
        <RegFixMode>Edit</RegFixMode>
    </Act>
<!--Restricted Sites-->
    <Act Type="Fix" SubType="RegFix">
        <Root>HCU</Root>
        <Path>Software\Microsoft\Windows\CurrentVersion\Internet
        Settings\zones\4</Path>
        <Bulk>yes</Bulk>
        <KeyValue>1001=3,1004=3,1200=3...
        </KeyValue>
        <KeyType>Word</KeyType>
        <RegFixMode>Edit</RegFixMode>
    </Act>
<!--Privacy Settings-->
    <Act Type="Fix" SubType="RegFix">
        <Root>HCU</Root>
        <Path>Software\Microsoft\Windows\CurrentVersion\Internet
Settings\P3P\History</Path>
        <SkipResult>yes</SkipResult>
        <RegFixMode>Delete</RegFixMode>
    </Act>
<!--Advanced Settings-->
    <Act Type="Fix" SubType="RegFix">
        <Root>HCU</Root>
        <Path>Software\Microsoft\Windows\CurrentVersion\
        Internet Settings</Path>
        <Bulk>yes</Bulk>
        <KeyValue>WarnonBadCertRecving=1,WarnOnZoneCrossing=0,
CertificateRevocation=0...</KeyValue>
        <KeyType>Word</KeyType>
        <RegFixMode>Edit</RegFixMode>
    </Act>
</LIB_OPT_IB>
```

As another example, regarding the "Messaging related issues" issue selected in the display 400 of FIG. 4, the following code segment defines the associated issue node, which is identified by the MESSG tag. The MESSG node references a number of intermediate nodes, namely CONST_OS_INFO, CONST_IS_ADMIN, CONST_LOC_LANG, and CONST_MSGR_VERSION. Specifically, each action (<Act>) node includes a <Name> which is provided on the display 400, and/or a <Value> which references one of the intermediate nodes. Each intermediate node, in turn, may reference one or more self-healing task nodes, such as in a library of task nodes. The self-healing task nodes can be provided using the techniques discussed herein.

```
<MESSG>
    <Act Type="Disp">
        <Name>OS Information</Name>
    </Act>
```

-continued

```
<Act Type="Const">
    <Name>Operating System</Name>
    <Value>CONST_OS_INFO</Value>
</Act>
<Act Type="Const">
    <Name>Is Administrator</Name>
    <Value>CONST_IS_ADMIN</Value>
    <OSSkip>Win 9x,Win Vista</OSSkip>
</Act>
<Act Type="Const">
    <Name>Local Language</Name>
    <Value>CONST_LOC_LANG</Value>
</Act>
<Act Type="Disp">
    <Name>Installed Client Version</Name>
</Act>
<Act Type="Const">
    <Name> Messaging Version</Name>
    <Value>CONST_MSGR_VERSION</Value>
</Act>
</MESSG>
```

As seen, in one possible approach, one or more instruction files of a self-healing tool can be provided in a local store with a hierarchical data structure that includes issue nodes, intermediate nodes, and self-healing task nodes. The issue nodes include <Issue> tags that define a diagnostic and/or repair issue. The intermediate nodes contain lists of diagnostic and/or repair libraries for the corresponding issue. Finally, a library section includes the diagnostics and/or repair tasks in task nodes.

Figure 9:
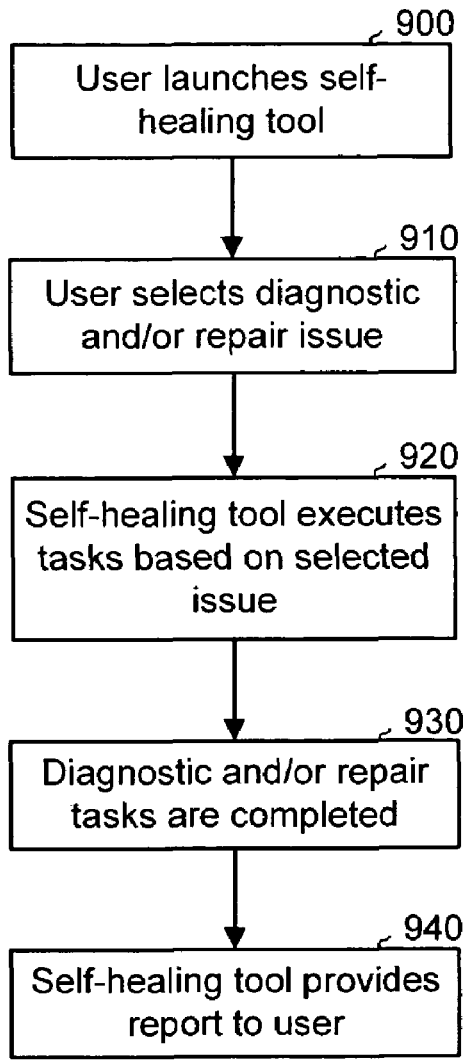
FIG. 9 illustrates a process in which a user accesses a self-healing tool.

FIG. 9 illustrates a process in which a user accesses a self-healing tool. At step 900, the user launches the self-healing tool in the same manner in which any other application is launched on the host machine. At step 910, the user selects a diagnostic and/or repair issue, such as using the display 200 of FIG. 2. At step 920, the self-healing tool executes diagnostic and/or repair tasks based on the selected issue. At step 930, the diagnostic and/or repair tasks are completed. The user may be prompted to provide additional information and/or instructions in some cases before the tasks can be completed. At step 940, the self-healing tool provides a report to the user indicating whether the issue was successfully resolved, such as via the example displays 300 (FIG. 3) and 400 (FIG. 4).

Figure 10:
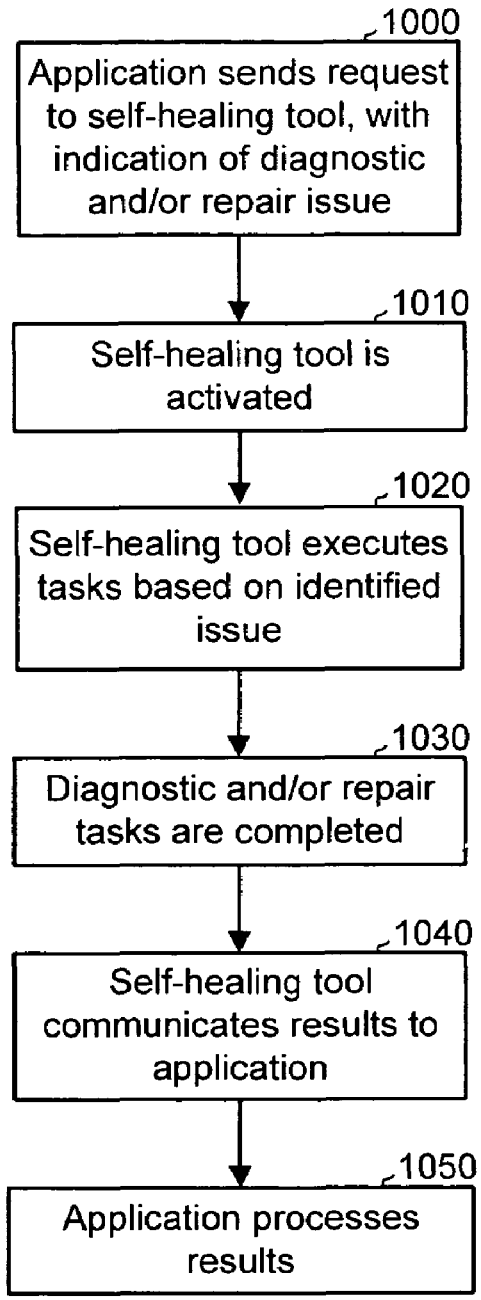
FIG. 10 illustrates a process in which an application automatically activates a self-healing tool.

FIG. 10 illustrates a process in which an application automatically activates a self-healing tool. In some situations it may be desirable for an application to directly access the self-healing tool to resolve a problem or to obtain diagnostic information. This allows the application to benefit from the capabilities of the self-healing tool without user involvement. At step 1000, the application, such as an email, messaging, or Internet browsing application, sends a request to the self-healing tool with an indication of a diagnostic and/or repair issue. Any desired communication protocol can be used for this purpose. At step 1010, the self-healing tool is activated and begins to execute. At step 1020, the self-healing tool executes diagnostic and/or repair tasks based on the identified issue. At step 1030, the diagnostic and/or repair tasks are completed and, at step 1040, the self-healing tool reports the results to the application. At step 1050, the application processes the results. For example, if the issue cannot be successfully resolved, the application may declare an error, terminate, or operate in a reduced functionality mode, for instance. The application may provide an appropriate message to the user in this case. If the issue has been successfully resolved, typically there is no need to inform the user, although this is also possible.

Figure 11:
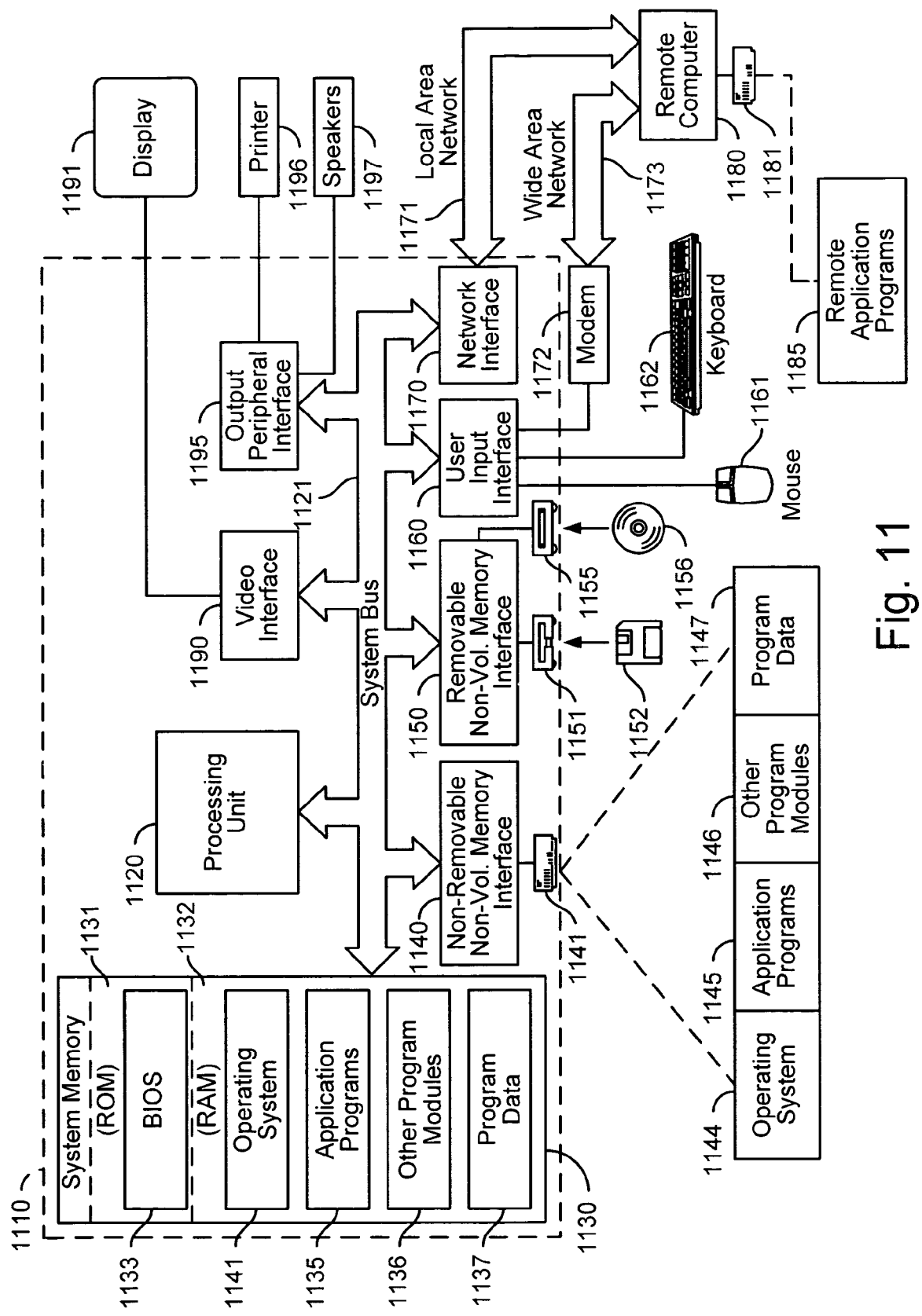
FIG. 11 is a block diagram of computer hardware suitable for implementing embodiments of the invention.

FIG. 11 is a block diagram of computer hardware suitable for implementing embodiments of the invention. An exemplary system for implementing the invention includes a general purpose computing device in the form of a computer 1110. Components of computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1110 typically includes a variety of computer readable media. Computer readable media can be any available media that can be accessed by computer 1110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11, provide storage of computer readable instructions, data structures, program modules and other data for the computer 1110. For example, hard disk drive 1141 is illustrated as storing operating system 1144, application programs 1145, other program modules 1146, and program data 1147. These components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. A user may enter commands and information into the computer 1110 through input devices such as a keyboard 1162 and pointing device 1161, commonly referred to as a mouse, trackball or touch pad. Other input devices (not shown) may include a microphone, joystick, game pad, satellite dish, scanner, or the like. These and other input devices are often connected to the processing unit 1120 through a user input interface 1160 that is coupled to the system bus, but may be connected by other interface and bus structures, such as a parallel port, game port or a universal serial bus (USB). A monitor 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1195.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated. The logical connections depicted include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the computer 1110, or portions thereof, may be stored in the remote memory storage device. By way of example, and not limitation, FIG. 11 illustrates remote application programs 1185 as residing on memory device 1181. It will be appreciated that the network connections shown are exemplary and other means of establishing a communications link between the computers may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A computer-implemented method for performing self-healing at a computer host, comprising:
   providing, at the computer host, at least one file of instructions which defines a plurality of self-healing tasks;
   providing, at the computer host, a self healing engine for executing the self-healing tasks using the at least one file of instructions, the at least one file of instructions being updateable independently of the self-healing engine;
   receiving an update definition via a remote download at the computer host; and
   updating the at least one file of instructions with the update definition by inserting the update definition into the at least one file of instructions, to thereby achieve an updated self-healing functionality.

2. The computer-implemented method of claim 1, wherein: the self-healing engine is hosted on at least one web page of a user interface.

3. The computer-implemented method of claim 1, wherein: the plurality of self-healing tasks are defined for a plurality of different applications at the computer host.

4. The computer-implemented method of claim 1, wherein: the self-healing engine executes the at least one self-healing task based on a request from an application at the computer host.

5. The computer-implemented method of claim 1, wherein: the self-healing task comprises at least one of writing and deleting a file at the computer host.

6. The computer-implemented method of claim 1, wherein: the self-healing task comprises at least one of writing and deleting a registry key.

7. The computer-implemented method of claim 1, wherein: the self-healing task comprises running a command line statement.

8. The computer-implemented method of claim 1, wherein: the self-healing task comprises at least one of starting and stopping a service at the computer host.

9. The computer-implemented method of claim 1, wherein: the self-healing task comprises registering a library.

10. Computer readable storage media having computer readable code embodied thereon for programming at least one processor to perform a method for self-healing at a computer host, the method comprising:
    accessing at least one file of instructions which defines at least one task, the at least one task is for at least one of diagnosis and repair for the computer host;
    receiving an update definition for the at least one task via a remote downlaod;
    updating the at least one file of instructions with the update definition by inserting the update definition into the at least one file of instructions, to change the at least one task to at least one updated task; and executing the at least one updated task using the at least one file of instructions, an engine performing the executing, and the at least one file of instructions being updateable independently of the engine.

11. The computer readable storage media of claim 10, wherein:
the at least one task is defined by at least one node in a hierarchy of nodes in the at least one file of instructions; and
the update definition comprises a node definition which is inserted into the hierarchy of nodes in the at least one file of instructions.

12. Computer readable storage media having computer readable code embodied thereon for providing at least one file of instructions for providing self-healing at a computer host, the at least one file of instructions comprising:
code segments for providing first nodes in a hierarchical node structure of the at least one file of instructions, each first node identifies an associated issue involving the computer host, the issue comprises at least one of a diagnostic issue and a repair issue; and
code segments for providing second nodes in the hierarchical node structure at a lower level than a level of the first nodes, each second node defines a different task, each task comprises at least one of a diagnostic task and repair task, at least one of the second nodes being invoked responsive to at least one of the first nodes being invoked, the first and second nodes being provided according to a markup language, and the second nodes are updateable without replacing the at least one file of instructions.

13. The computer readable storage media of claim 12, wherein:
the at least one file of instructions includes code segments for providing third nodes in the hierarchical node structure at a lower level than the level of the first nodes, and at a higher level than the level of the second nodes, each third node references at least one of the second nodes, at least one of the third nodes being invoked responsive to the at least one of the first nodes being invoked, and the at least one of the second nodes being invoked responsive to the at least one of the third nodes being invoked.

14. The computer readable storage media of claim 12, wherein:
the at least one of the first nodes is invoked responsive to a command received via a user interface.

15. The computer readable storage media of claim 12, wherein:
one of the second nodes is invoked responsive to one of the first nodes being invoked, and responsive to another of the first nodes being invoked, so that the one of the second nodes, which defines one of the different tasks, is invoked to resolve at least two different issues.

16. The computer-implemented method of claim 1, wherein: the update definition adds a new self-healing task to the plurality of self-healing tasks.

17. The computer-implemented method of claim 1, wherein:
the update definition modifies an existing self-healing task of the plurality of self-healing tasks.

18. The computer-implemented method of claim 1, wherein:
the updating the at least one file of instructions deletes an existing self-healing task from the plurality of self-healing tasks.

19. The computer-implemented method of claim 1, wherein:
the plurality of self-healing tasks are defined by a hierarchy of nodes in the at least one file of instructions; and
the update definition comprises a node definition which is inserted into the hierarchy of nodes in the at least one file of instructions.

20. The computer-implemented method of claim 1, further comprising:
providing a user interface which depicts the plurality of self-healing tasks; and
receiving a user command via the user interface which selects one of the plurality of self-healing tasks, where the self-healing engine executes the selected one of the plurality of self-healing tasks responsive to the receiving of the user command.

* * * * *

UNITED STATES PATENT AND TRADEMARK OFFICE
CERTIFICATE OF CORRECTION

| | | |
|---|---|---|
| PATENT NO. | : 7,523,340 B2 | Page 1 of 1 |
| APPLICATION NO. | : 11/443865 | |
| DATED | : April 21, 2009 | |
| INVENTOR(S) | : Devarajan K. Muthukumarasamy et al. | |

It is certified that error appears in the above-identified patent and that said Letters Patent is hereby corrected as shown below:

In column 16, line 20, in Claim 1, delete "self healing" and insert -- self-healing --, therefor.

In column 16, line 63, in Claim 10, delete "downlaod" and insert -- download --, therefor.

Signed and Sealed this
Third Day of May, 2011

David J. Kappos
*Director of the United States Patent and Trademark Office*